Aug. 5, 1958    M. C. MONCKTON    2,846,179
SLEEVE VALVE
Filed Nov. 16, 1956

INVENTOR.
MARY C. MONCKTON
BY George Spector
Agent

United States Patent Office 2,846,179
Patented Aug. 5, 1958

2,846,179

SLEEVE VALVE

Mary Catherine Monckton, New York, N. Y.

Application November 16, 1956, Serial No. 622,568

3 Claims. (Cl. 251—4)

This invention relates to improvements in sleeve valve construction.

In controlling the flow of granulated or powdered solids such as sugar, coal, chemicals, etc., the use of conventional valve forms involving sliding, pivoted or rotary gates is not satisfactory. The small particles lodge in the slideways or pivoting mechanisms obstructing movement and preventing complete closure. Due to frictional and abrasive contact with the granular particles, wear and tear on the moving parts is accelerated causing excessive replacement and maintenance.

The instant invention provides a valve wherein the mechanism causing closure of the flow passage is sealed off from the material in the passageway thereby eliminating entirely detrimental abrasive and corrosive action of the material on the closure mechanism. Moreover the passageway circumference is gradually reduced in a controlled fashion until complete closure is effected. Each stage of closure provides a substantially circular aperture thereby always centering the flow of material about the axis of the passageway permitting the material to be accurately discharged into a container.

In general the novel valve employs a cylindrical sleeve of flexible material such as cloth, nylon, chain mesh, etc. fixed circumferentially at each end. A cord, wire, chain or the like is looped about the sleeve midway between the fixed ends of the sleeve. Actuation of an operating handle causes the loop to reduce its size thereby tightening upon the sleeve resulting in a reduction in the size of the passageway thru the sleeve.

Accordingly the general object of this invention is the provision of a valve having a closure element which can be adjusted externally to provide circular aperture of varying radii and whereby the actuating mechanisms causing the variation in size of the aperture are completely sealed off from the material flowing thru the aperture by the closure element.

A more specific object of this invention is the provision of a valve having a flexible cylindrical element comprising a portion of the flow passage whereby the said element can be restricted in radial dimension by the actuation of a mechanism external to said element and sealed from the flowing material.

A still more specific object of this invention is a sleeve valve whereby the diameter of the sleeve opening is controlled by a rope, chain or the like looped freely about the sleeve, whereby the rope is sealed off from the contents flowing thru the valve.

Further objects and inventive features will become more apparent from the following detailed description, claims and attached drawings in which:

Figure 4:
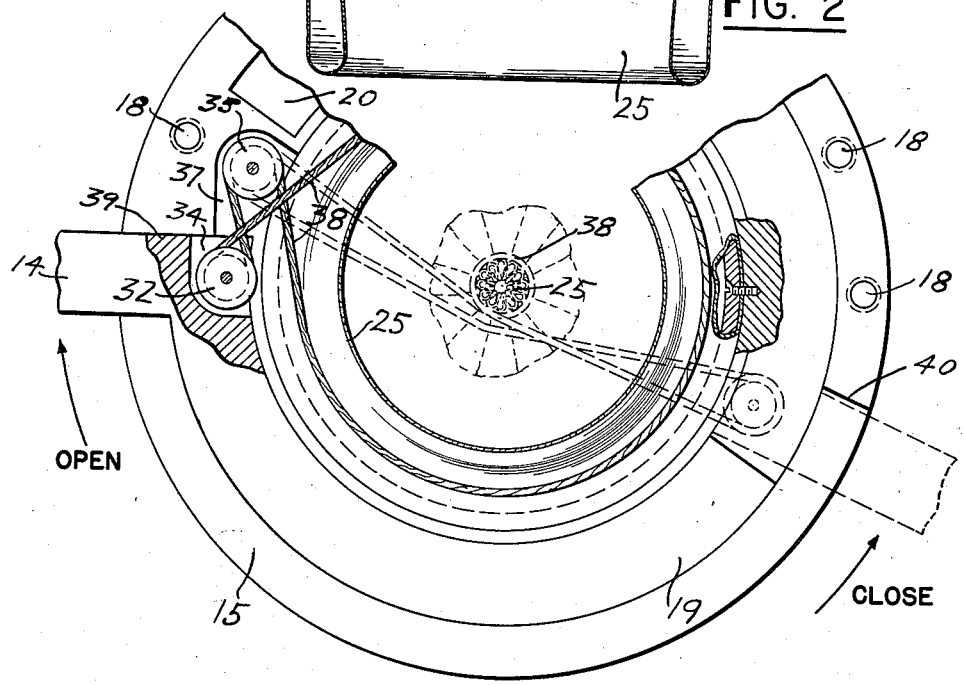

Figure 4 transverse view of the valve interior partially in section showing the mode of operation in effecting valve closure.

Figure 1:
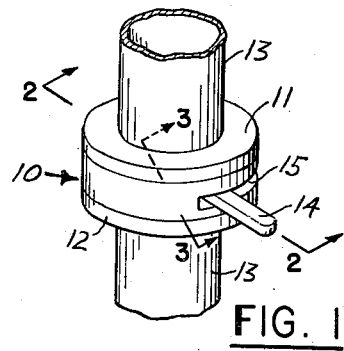
Figure 1 is a perspective view of the novel valve installed in a duct.

Referring now to the drawings, in Figure 1, an assembly 10 of the novel valve is shown secured to the coupling flanges 11 and 12 of a duct 13. An operating handle 14 projects radially outward through a slot 15 which permits approximately 180° of rotary movement from the open to closed positions. The assembly 10 comprises a pair of apertured discs 16 and 17 (Figure 2) of equal radius bolted together along half their periphery by bolts 18. As better seen in Figure 4, the handle 14 projects thru slot 15 which provides for approximately 180° movement from open to closed position. Only the opposite half of the discs 16 and 17 are secured with bolts 18 since the handle requires clearance for half the valve circumference. A ring 19 approximately 180° in circumference is integrally attached to handle 14 and is rotatably mounted within a circular internal slot 20 formed between the discs 16 and 17. The bolted halves of discs 16 and 17 include opposing shoulders 21 and 22 having opposing machined surfaces. Slot 20 includes outer circular guide surfaces 23 and inner circular guide surfaces 24 which coact with the outer and inner circumferences of the ring 19 to cause the ring to move in rotary fashion about the axis of the coaxial disc apertures. A cylindrical sleeve 25 is fixed peripherally at one end of the disc 16 by means of a circular collar 26 with countersunk screws 27 securing the collar to the disc. Similarly a collar 28 coacts with disc 17 to affix the other end of the sleeve to disc 17 via mounting screws 29.

Figure 2:
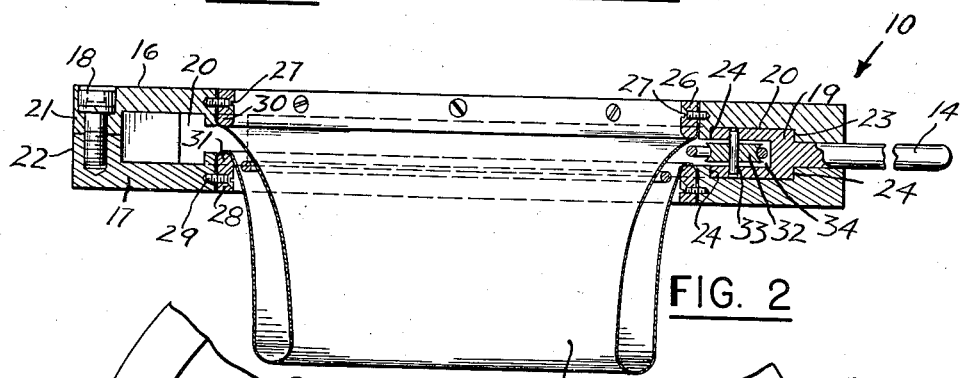
Figure 2 is a longitudinal sectional view thru plane 2—2 of Figure 1 showing pertinent valve details.

Although the sleeve is preferably made from nylon other flexible fabrics and materials may be employed. The opposing inner edges 30 and 31 of discs 16 and 17 respectively are beveled to eliminate wear and tear on the fabric hence the sleeve length is much greater than the length of the valve, the excess sleeve material hangs thru the disc apertures as seen in Figure 2.

Figure 3:
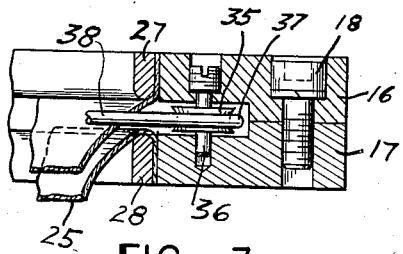
Figure 3 is another longitudinal sectional view thru plane 3—3 of Figure 1 showing additional details.

A pulley 32 is rotatably mounted about a pin 33 secured to the ring 19 within an internal cavity 34. As better seen in Figures 3 and 4 a second pulley 35 is mounted rotatably about a pin 36 secured longitudinally to discs 16 and 17 at a cavity 37 formed internally between the discs. Referring to Figure 4, it is seen that cavity 37 is adjacent the fully open position of the valve handle 14 and that pulley 35 is a fixed pulley and pulley 32 is movable about the valve axis; that is pulley 32 moves with the handle. A cord, rope, chain or the like is looped loosely about the sleeve 25 and passes endlessly through the two pulleys (Figure 4). When in the open position the loop is larger than the loosely suspended sleeve circumference. Movement of handle 14 toward the close position causes the loop or noose formed by the cord 38 to tighten about the sleeve resulting in a radial inward movement of all portions of the sleeve. Simultaneously the sleeve is lifted axially towards the discs. In the fully closed position depicted by the dotted lines in Figure 4, the noose is so reduced in diameter that the sleeve material is compressed together about the axis of the valve to completely close the passageway. It is to be noted that the cord portions forming the noose are exerting tensile forces in directions approximately 180° apart thereby centering the restricted portion of the sleeve about the valve axis. Furthermore in the fully closed position the sleeve material will have been moved to a position approximately in alignment with the ring 19. Due to the adjusting action of the pulleys on the endless cord 38 there is no significant frictional engagement between the cord and the sleeve the cord loop merely reduces in diameter and gradually squeezes together along radial lines the sleeve fabric always about the passageway axis. Thus the material of the sleeve will undergo little wear and tear due to contact with the cord and the flow of material through the valve will always be along the valve axis regardless of the extent of closure.

In opening the valve the noose is released by moving the handle back to the open position which corresponds to the limiting abutment 39 found in the discs 16 and 17. The closed position corresponds to the limiting abutment 40 also formed in discs 16 and 17. When returned to open position the elasticity and weight of the sleeve fabric serves to open the compressed portions of the sleeve. The passage of material through the sleeve will cause full valve opening since the cord loop is no longer in a restraining position.

It is now obvious that the only element of the valve that comes in contact with the flowing material is the sleeve itself. Thus the functioning of the operating mechanism can never be affected by the granular particles. Moreover the closure of the sleeve does not involve any twisting of the sleeve fabric or significant frictional engagement between the loop and the sleeve thereby ensuring longer lasting sleeves and cords. It is again emphasized that unlike other valve forms, the novel valve presented herein always centers the flow axis along the valve axis ensuring thereby accurate deposition of material from the valve.

It is to be further understood that modifications of size, shape, material, and arrangement of the herein disclosed valve are all within the scope of this invention.

Having thus described in detail the nature of this invention, the claims are as follows:

1. A valve assembly adapted for attachment in a duct comprising cylindrical housing with planar transverse end faces and an axial passageway intersecting and encompassed by the said faces, including a transverse internal cavity in the said housing between the end faces and encompassing concentrically the said passageway in combination with a disc rotatably mounted in the cavity for rotation about the said passageway axis, said disc having an aperture aligned with the said pasageway, in further combination with a sleeve of flexible material having one end secured to the housing adjacent one of said faces and the other end of the sleeve secured to the housing adjacent the other of said faces wherein the sleeve material between the sleeve ends is suspended loosely about the passageway in further combination with means encompassing the sleeve and secured to the said disc which cause a uniform contraction of the sleeve opening in response to rotation of the said disc in one direction.

2. A valve assembly as in claim 1 wherein the said means comprise a flexible cable connected to the disc and to the housing with the cable making a loop about the sleeve between the said connections whereby rotation of the disc in one direction results in an increase in the space between the said connections and a tightening of the loop about the sleeve.

3. A valve as in claim 2 wherein the cable is endless and the said connections comprise pulleys about which the cable passes.

References Cited in the file of this patent

UNITED STATES PATENTS 2,434,835    Colley _____ Jan. 20, 1948